(12) United States Patent
Achilles et al.

(10) Patent No.: US 11,031,784 B2
(45) Date of Patent: Jun. 8, 2021

(54) REACTIVE CURRENT MARGIN REGULATOR FOR POWER SYSTEMS

(71) Applicant: General Electric Company, Schenectady, NY (US)

(72) Inventors: Alfredo Sebastian Achilles, Niskayuna, NY (US); Einar Vaughn Larsen, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 382 days.

(21) Appl. No.: 15/897,658

(22) Filed: Feb. 15, 2018

(65) Prior Publication Data
US 2019/0252884 A1 Aug. 15, 2019

(51) Int. Cl.
| | | |
|---|---|---|
| H02J 3/18 | (2006.01) | |
| H02J 3/38 | (2006.01) | |
| H02J 3/16 | (2006.01) | |
| H02J 3/50 | (2006.01) | |

(52) U.S. Cl.
CPC .............. *H02J 3/1892* (2013.01); *H02J 3/16* (2013.01); *H02J 3/383* (2013.01); *H02J 3/386* (2013.01); *H02J 3/50* (2013.01); *H02J 3/18* (2013.01); *H02J 2203/20* (2020.01)

(58) Field of Classification Search
None
See application file for complete search history.

(56) References Cited

U.S. PATENT DOCUMENTS

| | | | |
|---|---|---|---|
| 4,994,684 A | 2/1991 | Lauw et al. | |
| 5,798,633 A | 8/1998 | Larsen et al. | |
| 7,224,081 B2 | 5/2007 | Larsen | |
| 7,312,537 B1 | 12/2007 | Walling | |
| 7,397,143 B2 | 7/2008 | Walling | |
| 7,629,705 B2 | 12/2009 | Barker et al. | |
| 7,855,539 B1 | 12/2010 | Wong et al. | |
| 8,046,109 B2 | 10/2011 | Larsen et al. | |
| 9,093,928 B2 | 7/2015 | Larsen | |
| 9,711,964 B2 | 7/2017 | Achilles et al. | |

(Continued)

FOREIGN PATENT DOCUMENTS

| | | |
|---|---|---|
| CN | 101924371 A | 12/2010 |
| WO | WO2010125687 A1 | 11/2010 |

OTHER PUBLICATIONS

PCT Search Report, dated Jun. 5, 2019.

(Continued)

*Primary Examiner* — Paul B Yanchus, III

(74) *Attorney, Agent, or Firm* — Dority & Manning. P.A.

(57) ABSTRACT

A method for maintaining sufficient reactive current margin in a power system connected to a power grid includes receiving, via a power limiter system, a reactive current command and an upper reactive current limit for the power system. The method also includes determining, via the power limiter system, a reactive current margin signal as a function of the reactive current command and the upper reactive current limit. Further, the method includes generating, via the power limiter system, a power command signal based on the reactive current margin signal. Moreover, the method includes controlling, via a system controller, operation of the power system based at least partially on the power command signal.

20 Claims, 9 Drawing Sheets

(56) References Cited

U.S. PATENT DOCUMENTS

| | | |
|---|---|---|
| 2010/0135789 A1 | 6/2010 | Zheng et al. |
| 2010/0268393 A1 | 10/2010 | Fischle et al. |
| 2010/0327584 A1* | 12/2010 | Fortmann ................. H02J 3/18 |
| | | 290/44 |
| 2011/0064573 A1 | 3/2011 | Viripullan et al. |
| 2011/0089693 A1 | 4/2011 | Nasiri |
| 2011/0109086 A1 | 5/2011 | Stiesdal |
| 2011/0133461 A1 | 6/2011 | Hjort |
| 2011/0137474 A1 | 6/2011 | Larsen et al. |
| 2011/0187109 A1 | 8/2011 | Ichinose et al. |
| 2011/0215578 A1 | 9/2011 | Ichinose et al. |
| 2013/0015660 A1 | 1/2013 | Hesselbaek et al. |
| 2013/0138257 A1 | 5/2013 | Edenfeld |
| 2015/0137520 A1* | 5/2015 | Garcia .................. H02J 3/1885 |
| | | 290/44 |
| 2015/0249412 A1* | 9/2015 | Larsen ................ H02M 5/4585 |
| | | 290/44 |
| 2016/0322821 A1* | 11/2016 | Saboor .................... F03D 7/048 |

OTHER PUBLICATIONS

Boemer et al., Fault Ride-through Requirements for Onshore Wind Power Plants in Europe: The Needs of the Power System, Power and Energy Society General Meeting 2011, Detroit, Session Impacts of LVRT on Wind Machines, IEEE, Jul. 24 2011, pp. 1-8.

* cited by examiner

REACTIVE CURRENT MARGIN REGULATOR FOR POWER SYSTEMS

FIELD

The present disclosure relates generally to power systems, and more specifically, to systems and methods for maintaining sufficient reactive current margin in power systems connected to a power grid.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

A power output of the generator increases with wind speed until the wind speed reaches a rated wind speed for the wind turbine. At and above the rated wind speed, the generator operates at a rated power. The rated power is an output power at which the generator can operate with a level of fatigue to turbine components that is predetermined to be acceptable. At wind speeds higher than a certain speed, or at a wind turbulence level that exceeds a predetermined magnitude, typically referred to as a "trip limit" or "monitor set point limit," wind turbines may be shut down, or the loads may be reduced by regulating the pitch of the rotor blades or braking the rotor, in order to protect wind turbine components against damage.

Variable speed operation of the generator facilitates enhanced capture of energy by the generator when compared to a constant speed operation of the wind turbine generator; however, variable speed operation of the generator produces electricity having varying voltage and/or frequency. More specifically, the frequency of the electricity generated by the variable speed generator is proportional to the speed of rotation of the rotor. Thus, a power converter may be coupled between the generator and the utility grid. The power converter outputs electricity having a fixed voltage and frequency for delivery on the grid.

In weak AC power systems, maximum power transmission requires active voltage regulation for stability. An important aspect of voltage stabilization is to have margin in the reactive current output of the voltage regulator. If the reactive current margin is lost, then a voltage collapse will occur if power continues to be pushed into the transmission system. Power converter controls have fast terminal voltage regulation to facilitate voltage stability in weak systems. In such systems, the voltage regulator commands reactive current within available limits. If the reactive current command hits the available limits, the voltage regulation is deficient and there is significant risk of voltage collapse.

Accordingly, the present disclosure is directed to a system and method for maintaining sufficient reactive current margin in power systems by limiting the active current recovery after a system fault to ensure voltage regulation is possible.

BRIEF DESCRIPTION

Aspects and advantages of the invention will be set forth in part in the following description, or may be obvious from the description, or may be learned through practice of the invention.

In one aspect, the present disclosure is directed to a method for maintaining sufficient reactive current margin in a power system connected to a power grid. The method includes receiving, via a power limiter system, a reactive current command and an upper reactive current limit for the power system. The method also includes determining, via the power limiter system, a reactive current margin signal as a function of the reactive current command and the upper reactive current limit. Further, the method includes generating, via the power limiter system, a power command signal based on the reactive current margin signal. Moreover, the method includes controlling, via a controller, operation of the power system based at least partially on the power command signal.

In one embodiment, the step of determining the reactive current margin signal as a function of the reactive current command and the upper reactive current limit further may include calculating a difference between the reactive current command and the upper reactive current limit. In another embodiment, the method may include processing the reactive current margin signal via a proportional-integral regulator.

In further embodiments, the step of controlling operation of the power system may include limiting operation of the power system based at least partially on the power command. More specifically, in certain embodiments, the method may include sending, via a converter controller, a signal to a system controller indicating a power command limit value. The method then includes receiving, via the system controller, the signal from the converter controller and modifying at least one of torque and/or speed commands for a predetermined duration based on the power command limit value. Alternatively, the method may include receiving, via the system controller, the signal from the converter controller and implementing a power system shut down.

In additional embodiments, the step of generating the power command signal based on the reactive current margin signal can be enabled or disabled from the plant level controller based, for example, on plant level active power generation.

In additional embodiments, the method may include sending, via a converter controller, a signal to a plant-level controller indicating a power command limit value for at least one power system in a collection of power systems. In such embodiments, the method may further include receiving, via the plant-level controller, signals from all power systems in the collection of power systems, determining, via the plant-level controller a power curtailment command required for stable operation of the collection of power systems, and sending the power curtailment command to each of the power systems.

In several embodiments, the power system may correspond to a wind turbine power system, a solar power system, an energy storage system, or any other suitable power system.

In another aspect, the present disclosure is directed to an electrical power system connected to a power grid. The electrical power system includes an electric generator, a power conversion assembly coupled to the electric generator, a power limiter system communicatively coupled to the power conversion assembly, and a controller coupled to the power limiter system. The power conversion assembly is configured to receive power generated by the electric generator and convert the power received to a power suitable for transmission to the power grid. The power limiter system is configured to receive a reactive current command and an upper reactive current limit for the electrical power system, determine a reactive current margin signal as a function of the reactive current command and the upper reactive current limit, and generate a power command signal based on the reactive current margin signal. As such, the controller is configured to control operation of the electrical power system based at least partially on the power command signal. It should be understood that the electrical power system may further include any of the additional features as described herein.

In yet another aspect, the present disclosure is directed to a method for controlling operation of a wind turbine power system connected to a power grid. The method includes receiving, via a power limiter system, a reactive current command and an upper reactive current limit for the wind turbine power system, determining, via the power limiter system, a reactive current margin signal as a function of the reactive current command and the upper reactive current limit, measuring at least one operating condition of the wind turbine power system, the operating condition comprising a phase locked loop (PLL) error that is dependent upon an occurrence of a grid contingency event; analyzing, via the power limiter system, the operating condition to identify an occurrence of a grid contingency event responsive to the PLL error being above a predefined level, generating, via the power limiter system, a power command signal in response to the grid contingency event based at least partially on the reactive current margin signal, and controlling, via a controller, operation of the wind turbine power system based at least partially on the power command signal. It should be understood that the method may further include any of the additional features and/or steps as described herein.

These and other features, aspects and advantages of the present invention will become better understood with reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
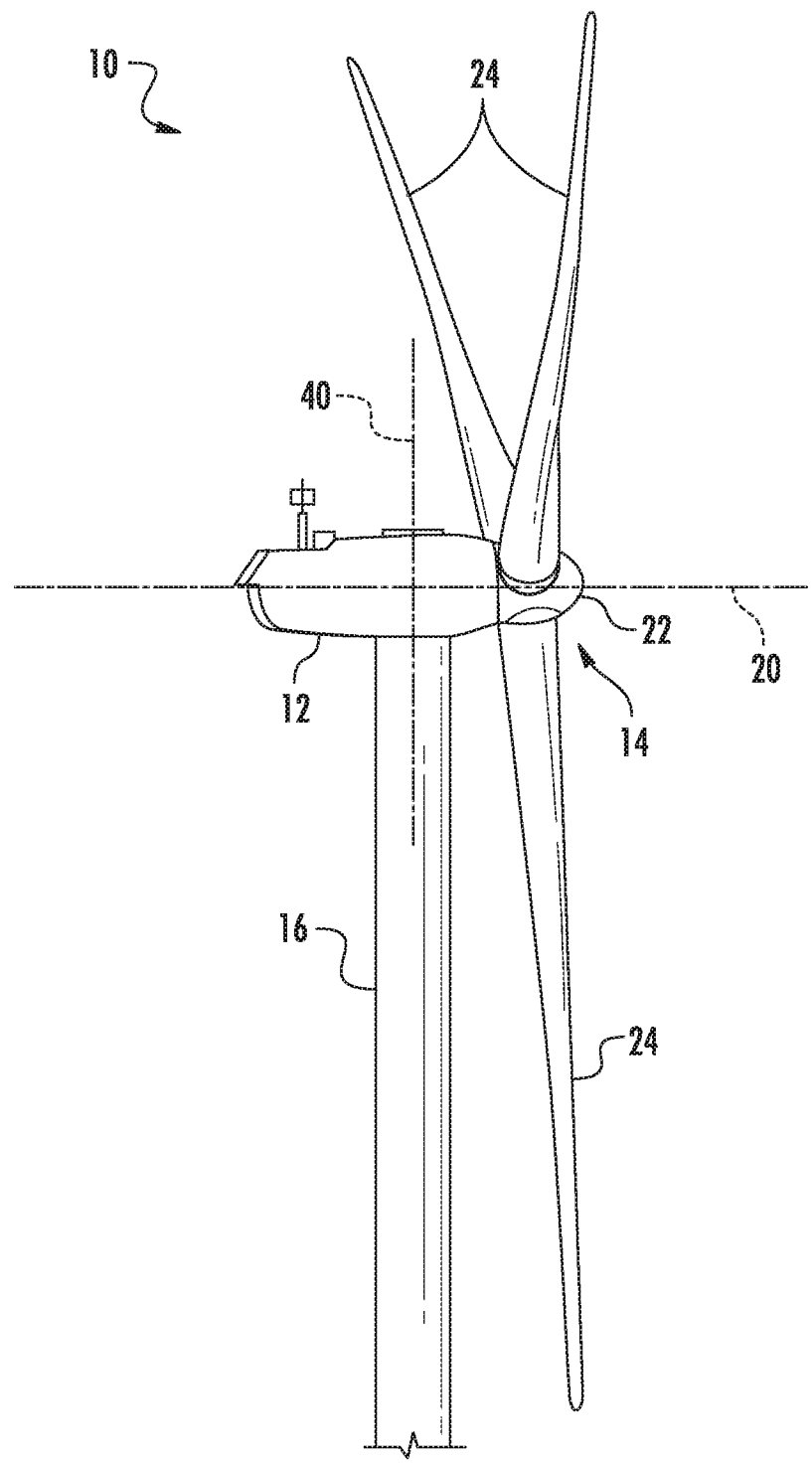
FIG. 1 illustrates a perspective view of one embodiment of a portion of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to system and methods for maintaining sufficient reactive current margin in power systems. Such power systems, for example, may include wind turbine power systems, solar power systems, energy storage systems, or any other power systems. In weak AC power systems, maximum power transmission requires active voltage regulation for stability. Thus, such systems include a margin in the reactive current output of the voltage regulator for voltage stabilization. If this margin is lost, then a voltage collapse will occur if power continues to be pushed into the transmission system. As such, the system of the present disclosure includes a power limiter system that receives a reactive current command and an upper reactive current limit for the power system. The power limiter system then determines a reactive current margin signal as a function of the reactive current command and the upper reactive current limit. Further, the power limiter system generates a power command signal based on the reactive current margin signal and the controller controls operation of the power system based at least partially on the power command signal. This control feature enables stable operation in weak power systems with smaller turbine component ratings and avoids expensive dynamic compensation equipment.

Referring now to the drawings, FIG. 1 illustrates a perspective view of one embodiment of a wind turbine power system 10 (also referred to herein simply as wind turbine 10) according to the present disclosure. As shown, the wind turbine 10 described herein includes a horizontal-axis configuration, however, in some embodiments, the wind turbine 10 may include, in addition or alternative to the horizontal-axis configuration, a vertical-axis configuration (not shown). The wind turbine 10 may be coupled to an electrical load (not shown in FIG. 1), such as, but not limited to, a power grid, for receiving electrical power therefrom to drive operation of the wind turbine 10 and/or its associated components and/or for supplying electrical power generated by the wind turbine 10 thereto.

The wind turbine 10 may include a nacelle 12 and a rotor (generally designated by 14) coupled to nacelle 12 for rotation with respect to nacelle 12 about an axis of rotation 20. In one embodiment, the nacelle 12 is mounted on a tower 16, however, in some embodiments, in addition or alternative to the tower-mounted nacelle 12, the nacelle 12 may be positioned adjacent the ground and/or a surface of water. The rotor 14 includes a hub 22 and a plurality of rotor blades 24 extending radially outwardly from the hub 22 for converting wind energy into rotational energy. Although the rotor 14 is described and illustrated herein as having three rotor blades 24, the rotor 14 may have any number of rotor blades 24. Further, the rotor blades 24 may each have any length that allows the wind turbine 10 to function as described herein.

Figure 2:
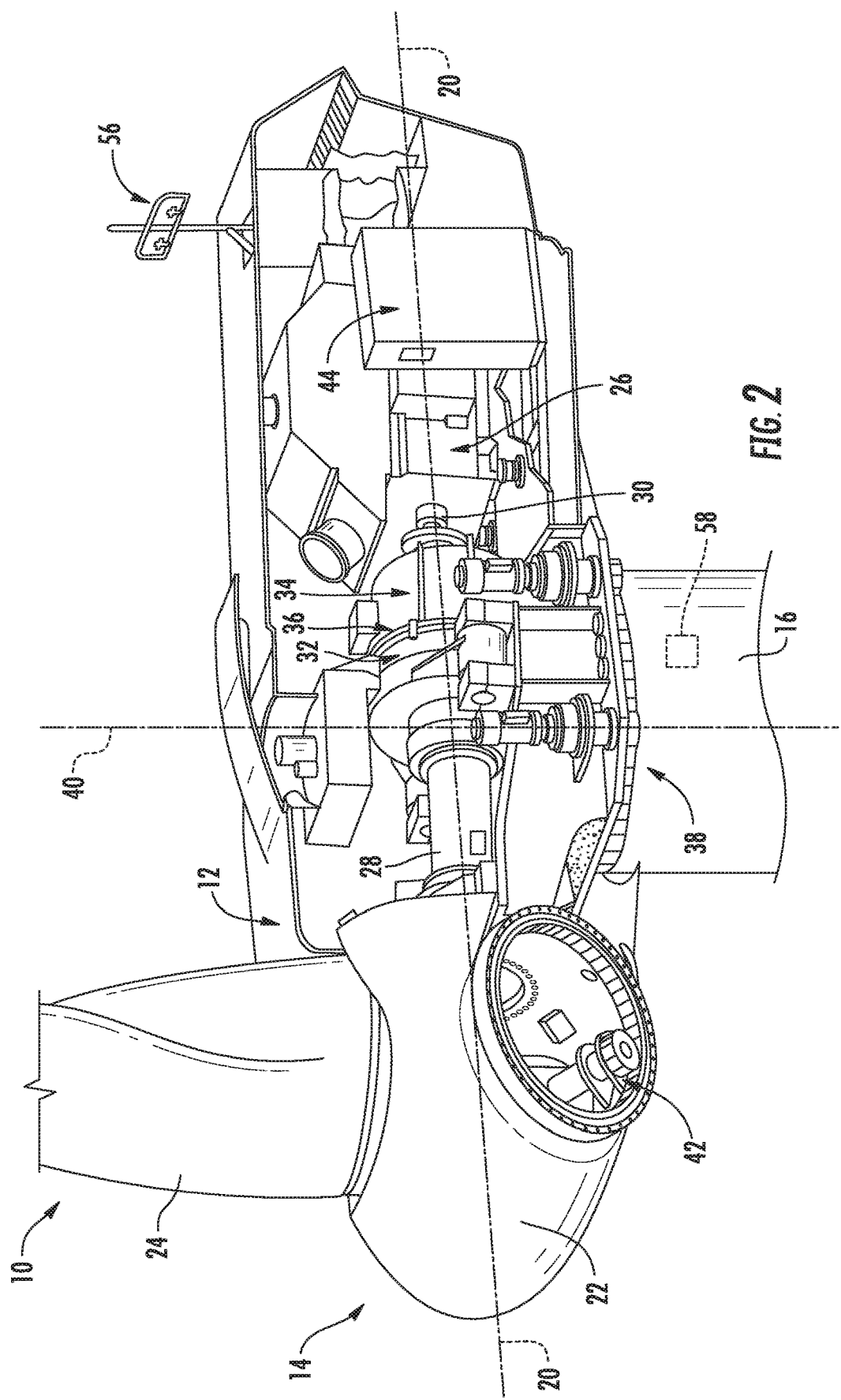
FIG. 2 illustrates an internal, perspective view of one embodiment of a nacelle of the wind turbine according to the present disclosure.

Referring now to FIG. 2, the wind turbine 10 also includes an electrical generator 26 coupled to the rotor 14 for generating electrical power from the rotational energy generated by the rotor 14. The generator 26 may be any suitable type of electrical generator, such as, but not limited to, a wound rotor induction generator, a double-fed induction generator (DFIG, also known as dual-fed asynchronous generators), a permanent magnet (PM) synchronous generator, an electrically-excited synchronous generator, and a switched reluctance generator. The generator 26 includes a stator (not shown) and a rotor (not shown) with an air gap included therebetween. The rotor 14 includes a rotor shaft 28 coupled to the rotor hub 22 for rotation therewith. Further, the generator 26 is coupled to the rotor shaft 28 such that rotation of the rotor shaft 28 drives rotation of the generator rotor, and therefore operation of the generator 26. In one embodiment, the generator rotor has a generator shaft 30 coupled thereto and coupled to the rotor shaft 28 such that rotation of the rotor shaft 28 drives rotation of the generator rotor. In other embodiments, the generator rotor is directly coupled to the rotor shaft 28, sometimes referred to as a "direct-drive wind turbine." In one embodiment, the generator shaft 30 is coupled to the rotor shaft 28 through a gearbox 32, although in other embodiments generator shaft 30 is coupled directly to rotor shaft 28.

The torque of the rotor 14 drives the generator rotor to thereby generate variable frequency AC electrical power from rotation of rotor 14. The generator 26 has an air gap torque between the generator rotor and stator that opposes the torque of rotor 14. A power conversion assembly 34 is coupled to the generator 26 for converting the variable frequency AC to a fixed frequency AC for delivery to an electrical load (not shown in FIG. 2), such as, but not limited to a power grid (not shown in FIG. 2), coupled to the generator 26. The power conversion assembly 34 may include a single frequency converter or a plurality of frequency converters configured to convert electricity generated by the generator 26 to electricity suitable for delivery over the power grid. The power conversion assembly 34 may also be referred to herein as a power converter. The power conversion assembly 34 may be located anywhere within or remote to the wind turbine 10. For example, the power conversion assembly 34 may be located within a base (not shown) of the tower 16.

In certain embodiments, the wind turbine 10 may include a rotor speed limiter, for example, but not limited to a disk brake 36. The disk brake 36 brakes rotation of the rotor 14 to, for example, slow rotation of the rotor 14, the brake rotor 14 against full wind torque, and/or reduce the generation of electrical power from the generator 26. Furthermore, in some embodiments, the wind turbine 10 may include a yaw system 38 for rotating the nacelle 12 about an axis of rotation 40 for changing a yaw of rotor 14, and more specifically for changing a direction faced by the rotor 14 to, for example, adjust an angle between the direction faced by the rotor 14 and a direction of wind.

In one embodiment, the wind turbine 10 includes a variable blade pitch system 42 for controlling, including but not limited to changing, a pitch angle of blades 24 (shown in FIGS. 1-2) with respect to a wind direction. The pitch system 42 may be coupled to a controller 44 for control thereby. The pitch system 42 is coupled to the hub 22 and the rotor blades 24 for changing the pitch angle of blades 24 by rotating the rotor blades 24 with respect to the hub 22. The pitch actuators may include any suitable structure, configuration, arrangement, means, and/or components, whether described and/or shown herein, such as, but not limited to, electrical motors, hydraulic cylinders, springs, and/or servomechanisms. Moreover, the pitch actuators may be driven by any suitable means, whether described and/or shown herein, such as, but not limited to, hydraulic fluid, electrical power, electro-chemical power, and/or mechanical power, such as, but not limited to, spring force.

Figure 3:
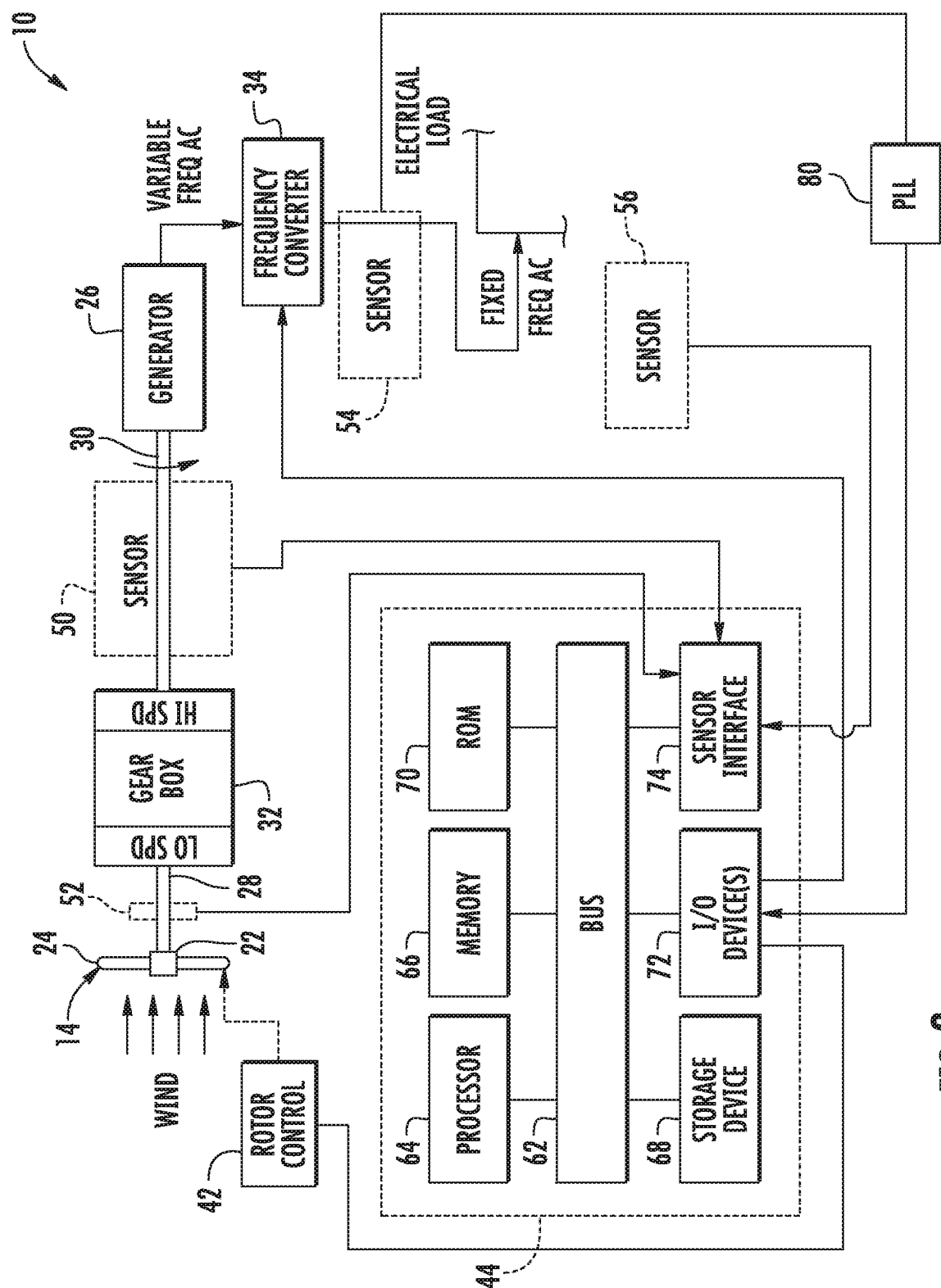
FIG. 3 illustrates a block diagram of one embodiment of various electrical components of a wind turbine according to the present disclosure.

Referring now to FIG. 3, a block diagram of one embodiment of various electrical components of the wind turbine 10 according to the present disclosure is illustrated. As shown, the wind turbine 10 includes one or more controllers 44 coupled to at least one component of wind turbine 10 for generally controlling operation of the wind turbine 10 and/or controlling operation of the components thereof, regardless of whether such components are described and/or shown herein. For example, in one embodiment, the controller 44 is coupled to the pitch system 42 for generally controlling the rotor 14. In addition, the controller 44 may be mounted within the nacelle 12 (as shown in FIG. 2), however, additionally or alternatively, one or more controllers 44 may be remote from the nacelle 12 and/or other components of the wind turbine 10. The controller(s) 44 may be used for overall system monitoring and control including, without limitation, pitch and speed regulation, high-speed shaft and yaw brake application, yaw and pump motor application, and/or fault monitoring. Alternative distributed or centralized control architectures may be used in some embodiments.

Figure 4:
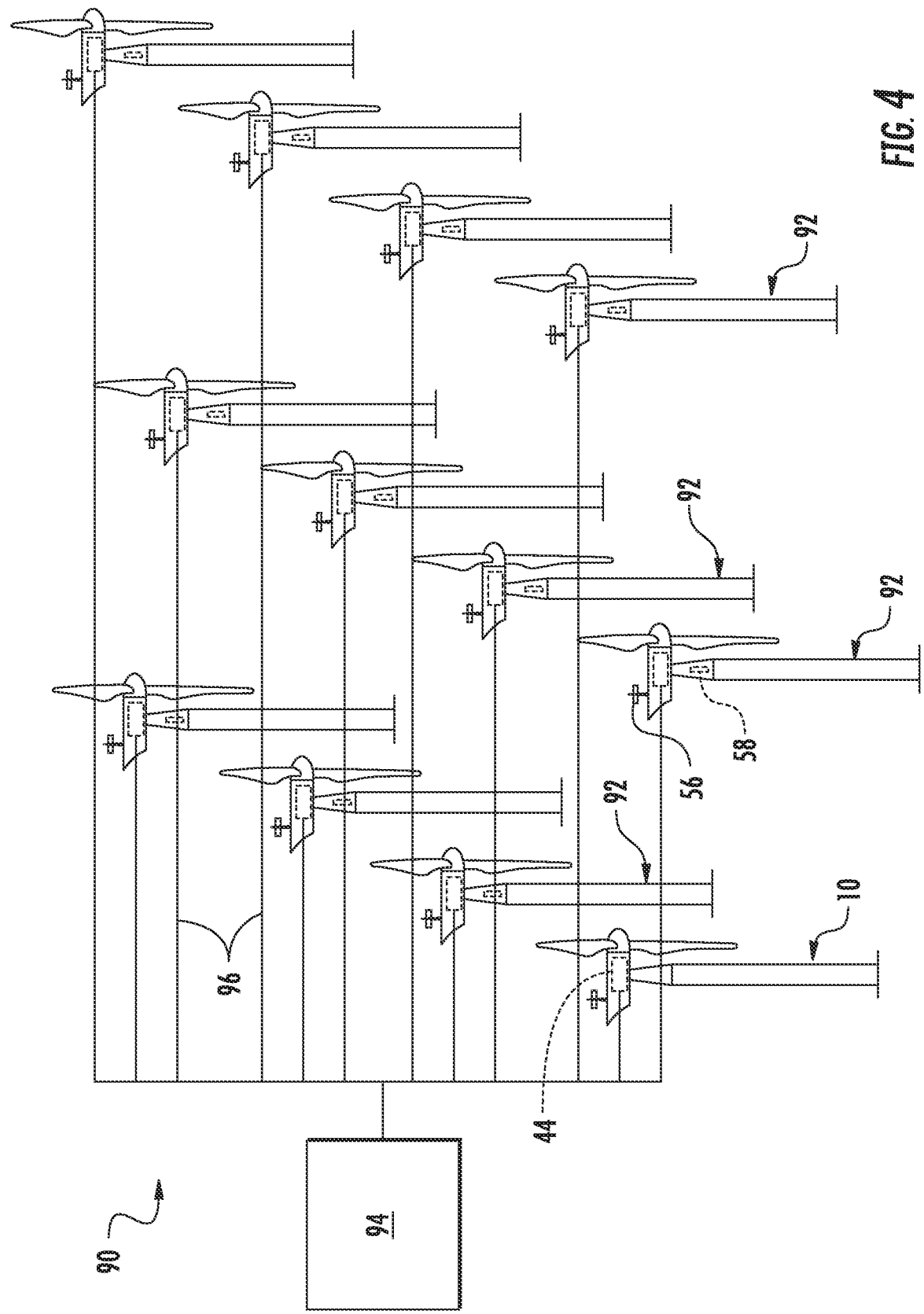
FIG. 4 illustrates a schematic view of one embodiment of a wind farm according to the present disclosure.

In one embodiment, the wind turbine 10 includes a plurality of sensors, for example, sensors 50, 52, 54, 56, 58 as shown in FIGS. 1, 2, and 4. As such, the sensors 50, 52, 54, 56, 58 are configured to measure a variety of parameters including, without limitation, operating conditions and atmospheric conditions. For example, as shown, the wind turbine 10 includes a wind sensor 56, such as an anemometer or any other suitable device, configured for measuring wind speeds or any other wind parameter. The wind parameters include information regarding at least one of or a combination of the following: a wind gust, a wind speed, a wind direction, a wind acceleration, a wind turbulence, a wind shear, a wind veer, a wake, SCADA information, or similar. Further, the wind turbine 10 may also include one or more additional sensors for monitoring additional operational parameters of the wind turbine 10. Further, each sensor 50, 52, 54, 56, 58 may be an individual sensor or may include a plurality of sensors. The sensors 50, 52, 54, 56, 58 may be any suitable sensor having any suitable location within or remote to wind turbine 10 that allows the wind turbine 10 to function as described herein. In some embodiments, the sensors 50, 52, 54, 56, 58 are coupled to one of the controllers 44, 94, 156 described herein for transmitting measurements to the controllers 44, 94, 156 for processing thereof.

Still referring to FIG. 3, the controller 44 includes may include a bus 62 or other communications device to communicate information. Further, one or more processor(s) 64 may be coupled to the bus 62 to process information, including information from the sensors 50, 52, 54, 56, 58 and/or other sensor(s). The processor(s) 64 may include at least one computer. As used herein, the term computer is not limited to integrated circuits referred to in the art as a computer, but broadly refers to a processor, a microcontroller, a microcomputer, a programmable logic controller (PLC), an application specific integrated circuit, and other programmable circuits, and these terms are used interchangeably herein.

The controller 44 may also include one or more random access memories (RAM) 66 and/or other storage device(s) 68. Thus, as shown, the RAM(s) 66 and storage device(s) 68 may be coupled to the bus 62 to store and transfer information and instructions to be executed by processor(s) 64. The RAM(s) 66 (and/or storage device(s) 68, if included) can also be used to store temporary variables or other intermediate information during execution of instructions by the processor(s) 64. The controller 44 may also include one or more read only memories (ROM) 70 and/or other static storage devices coupled to the bus 62 to store and provide static (i.e., non-changing) information and instructions to the processor(s) 64. The processor(s) 64 process information transmitted from a plurality of electrical and electronic devices that may include, without limitation, speed and power transducers. Instructions that are executed include, without limitation, resident conversion and/or comparator algorithms. The execution of sequences of instructions is not limited to any specific combination of hardware circuitry and software instructions.

The controller 44 may also include, or may be coupled to, input/output device(s) 72. The input/output device(s) 72 may include any device known in the art to provide input data to the controller 44 and/or to provide outputs, such as, but not limited to, yaw control and/or pitch control outputs. Instructions may be provided to the RAM 66 from the storage device 68 including, for example, a magnetic disk, a read-only memory (ROM) integrated circuit, CD-ROM, and/or DVD, via a remote connection that is either wired or wireless providing access to one or more electronically-accessible media. In some embodiments, hard-wired circuitry can be used in place of or in combination with software instructions. Thus, execution of sequences of instructions is not limited to any specific combination of hardware circuitry and software instructions, whether described and/or shown herein. Also, in one embodiment, the input/output device(s) 72 may include, without limitation, computer peripherals associated with an operator interface such as a mouse and a keyboard (neither shown in FIG. 3). Alternatively, other computer peripherals may also be used that may include, for example, a scanner (not shown in FIG. 3). Furthermore, in one embodiment, additional output channels may include, for example, an operator interface monitor (not shown in FIG. 3). The controller 44 may also include a sensor interface 74 that allows controller 44 to communicate with the sensors 50, 52, 54, 56, 58 and/or other sensor(s). The sensor interface 74 may include one or more analog-to-digital converters that convert analog signals into digital signals that can be used by the processor(s) 64.

In another embodiment, the wind turbine 10 also includes a phase locked loop (PLL) regulator 80. For instance, as shown, the PLL regulator 80 is coupled to sensor 54. In one embodiment, as shown, the sensor 54 is a voltage transducer configured to measure a terminal grid voltage output by frequency converter 34. Alternatively, the PLL regulator 80 is configured to receive a plurality of voltage measurement signals from a plurality of voltage transducers. In an example of a three-phase generator, each of three voltage transducers is electrically coupled to each one of three phases of a grid bus. The PLL regulator 80 may be configured to receive any number of voltage measurement signals from any number of voltage transducers that allow the PLL regulator 80 to function as described herein.

Referring now to FIG. 4, the wind turbine 10 described herein may be part of a wind farm 90 that is controlled according to the system and method of the present disclosure is illustrated. As shown, the wind farm 90 may include a plurality of wind turbines 92, including the wind turbine 10 described above, and a farm controller 94. For example, as shown in the illustrated embodiment, the wind farm 90 includes twelve wind turbines, including wind turbine 10. However, in other embodiments, the wind farm 90 may include any other number of wind turbines, such as less than twelve wind turbines or greater than twelve wind turbines. In one embodiment, the controller 44 of the wind turbine 10 may be communicatively coupled to the farm controller 94 through a wired connection, such as by connecting the controller 44 through suitable communicative links 96 or networks (e.g., a suitable cable). Alternatively, the controller 44 may be communicatively coupled to the farm controller 94 through a wireless connection, such as by using any suitable wireless communications protocol known in the art. In addition, the farm controller 94 may be generally configured similar to the controllers 44 for each of the individual wind turbines 92 within the wind farm 90.

Figure 5:
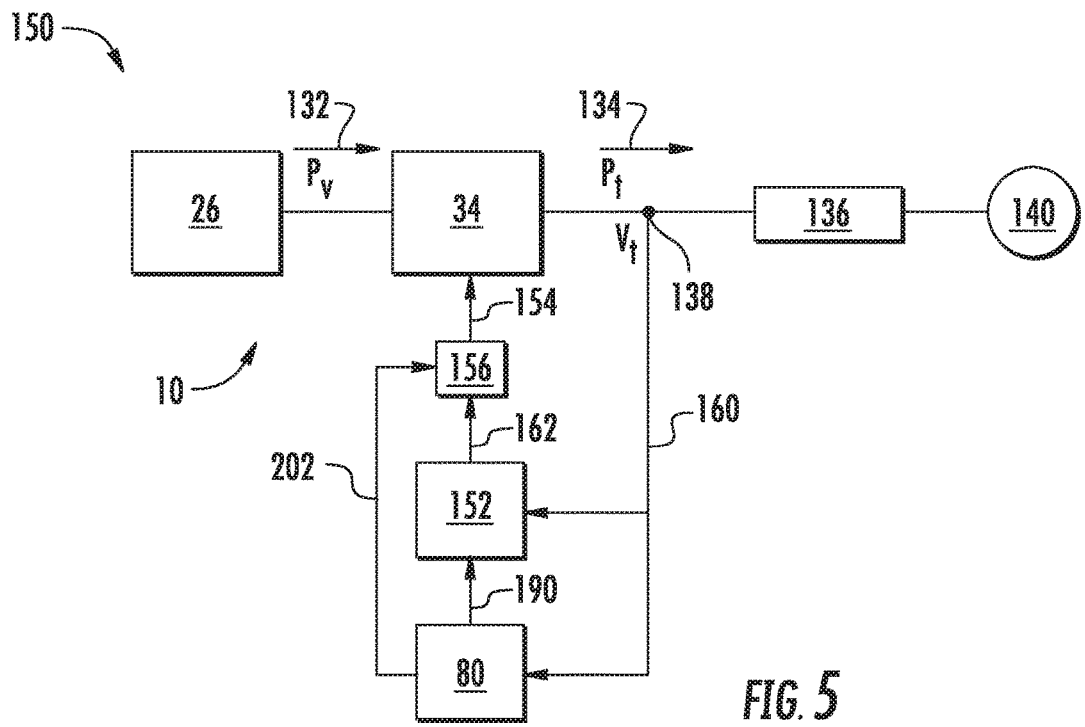
FIG. 5 illustrates a block diagram of one embodiment of a power generation and delivery system that may include the wind turbine shown in FIG. 1.

Referring now to FIG. 5, a block diagram of one embodiment of a power generation and delivery system 150 of the wind turbine 10 is illustrated. As shown, the power generation and delivery system 150 includes an energy source, for example, the generator 26. Although described herein as the wind turbine generator 26, the energy source may include any type of electrical generator that allows the system 150 to function as described herein. The system 150 also includes a power converter, such as, the power converter 34. Thus, as shown, the power converter 34 receives variable frequency electrical power 132 generated by the generator 26 and converts electrical power 132 to an electrical power 134 (referred to herein as a terminal power 134) suitable for transmission over an electric power transmission and distribution grid 136 (referred to herein as utility grid 136). A terminal voltage ($V_t$) 138 is defined at a node between the power converter 34 and the utility grid 136. A load 140 is coupled to the utility grid 136 where a Thevenin voltage is defined. As described above, variable speed operation of the wind turbine 10 facilitates enhanced capture of energy when compared to a constant speed operation of the wind turbine 10, however, variable speed operation of the wind turbine 10 produces the electrical power 132 having varying voltage and/or frequency. More specifically, the frequency of the electrical power 132 generated by the variable speed generator 26 is proportional to the speed of rotation of the rotor 14 (shown in FIG. 1). In one embodiment, the power converter 34 outputs the terminal power 134 having a substantially fixed voltage and frequency for delivery on the utility grid 136.

The power converter 34 also controls an air gap torque of the generator 26. The air gap torque is present between the generator rotor (not shown in FIG. 3) and the generator stator (not shown in FIG. 3) and opposes the torque applied to the generator 26 by the rotor 14. A balance between a torque on the rotor 14 created by interaction of the rotor blades 24 and the wind and the air gap torque facilitates stable operation of the wind turbine 10. Wind turbine adjustments, for example, blade pitch adjustments, or grid events, for example, low voltage transients or zero voltage transients on the utility grid 136, may cause an imbalance between the torque on the rotor 14 caused by the wind and the air gap torque. The power converter 34 controls the air gap torque which facilitates controlling the power output of the generator 26, however, the wind turbine 10 may not be able to operate through certain grid events, or may sustain wear and/or damage due to certain grid events, due to a time period required for adjustments to wind turbine operation to take effect after detecting the grid event.

Still referring to FIG. 5, the system 150 includes a grid-dependent power limiter system 152. In such embodiments, a controller, for example, but not limited to, controller 44 (shown in FIG. 3), may be programmed to perform the functions of the grid-dependent power limiter system 152. However, in alternative embodiments, the functions of the grid-dependent power limiter system 152 may be performed by any circuitry configured to allow the system 150 to function as described herein. The power limiter system 152 is configured to identify the occurrence of a grid contingency event, and provide the power converter 34 with signals that facilitate providing a stable recovery from the grid event.

The power conversion assembly 34 is configured to receive control signals 154 from a converter interface controller 156. The control signals 154 are based on sensed operating conditions or operating characteristics of the wind turbine 10 as described herein and used to control the operation of the power conversion assembly 34. Examples of measured operating conditions may include, but are not limited to, a terminal grid voltage, a PLL error, a stator bus voltage, a rotor bus voltage, and/or a current. For example, the sensor 54 measures terminal grid voltage 138 and transmits a terminal grid voltage feedback signal 160 to power limiter system 152. The power limiter system 152 generates a power command signal 162 based at least partially on the feedback signal 160 and transmits power command signal 162 to the converter interface controller 156. In an alternative embodiment, the converter interface controller 156 is included within the system controller 44. Other operating condition feedback from other sensors also may be used by the controller 44 and/or converter interface controller 156 to control the power conversion assembly 34.

Voltage stability as used herein generally refers to the ability of the system 150 to maintain steady voltages at all buses in the system 150 after being subjected to a disturbance from a given initial operating point. As such, the system state enters the voltage instability region when a disturbance or an increase in load demand or alteration in system state results in an uncontrollable and continuous drop in system voltage (i.e. a voltage collapse). A voltage collapse usually occurs in the system 150 when the system 150 is heavily loaded or faulted or has a shortage of reactive power. In many instances, voltage collapse is typically associated with the reactive power demand of load not being met due to a shortage in reactive power production and transmission. Accordingly, voltage collapse is a manifestation of voltage instability in the system 150.

A grid event, also referred to herein as a grid contingency event, may leave the utility grid 136 in a degraded mode where the grid impedance is too high to accommodate power generated by the generator 26, thereby causing an instable system. An example of a grid event includes a short-circuit fault on one of the transmission lines within the utility grid 136. Electrical transmission protection actions remove the faulted portion of the utility grid 136 to permit operation of the remaining unfaulted portion of the utility grid 136. However, a transmission path remains that is degraded in its ability to transmit power from the system 150 to the load 140. Such grid events cause a brief period of low voltage on the utility grid 136 prior to clearing the faulted portion of the utility grid 136. Typically, the terminal voltage 138 will approach zero volts at the time of the grid event. Often, a low voltage transient and/or a zero voltage transient will cause a generator trip and associated consequences to the semiconductor devices (e.g., potential damage to components of the wind turbine 10). The system 150 facilitates low voltage ride through capability (LVRT) as well as zero voltage ride through (ZVRT) capability for the wind turbine 10 such that a potential for a wind turbine generator trip and associated consequences to the semiconductor devices are mitigated during low voltage transients and/or zero voltage transients.

Figure 6:
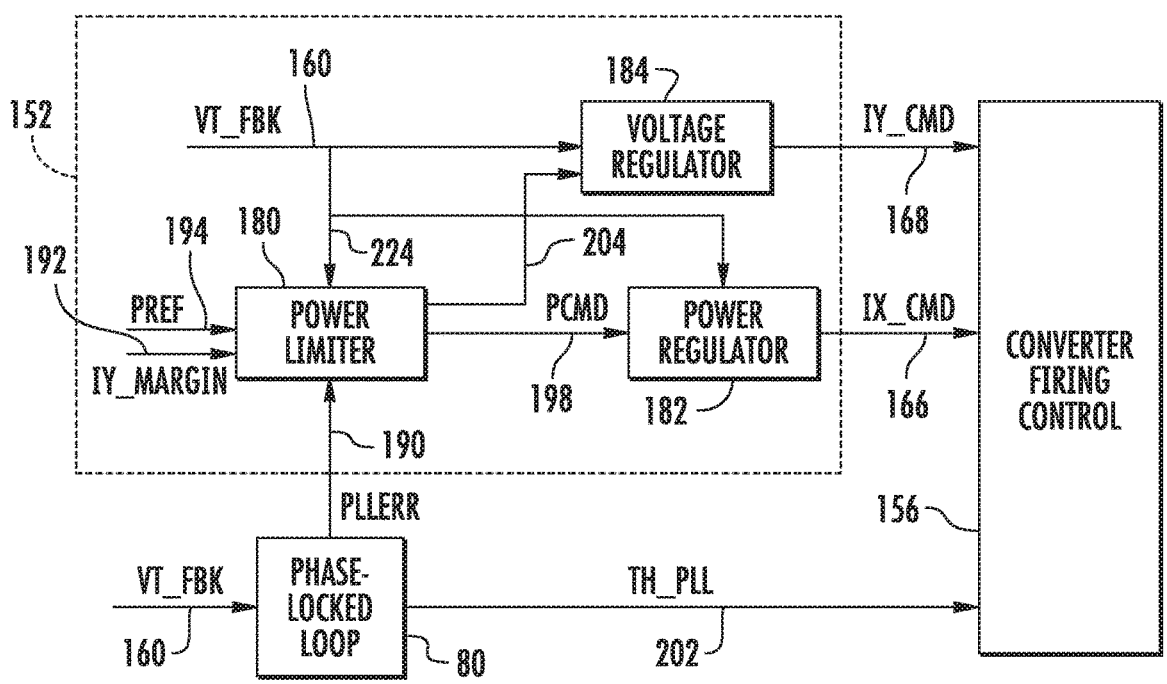
FIG. 6 illustrates a block diagram of one embodiment of a power limiter system that may be included within the power generation and delivery system shown in FIG. 4.

The methods and systems described herein facilitate maintaining sufficient reactive current margin in the power system 150 to maintain voltage stability, thereby preventing voltage collapse. Thus, as shown in FIG. 6, a block diagram of one embodiment of the power limiter system 152 of the wind turbine 10 that maintains sufficient reactive current margin is illustrated. As shown, the power limiter system 152 is configured to output the power command signal 162 (shown in FIG. 5), which in one embodiment, is at least one of a real current command signal 166 and a reactive current command signal 168. In one embodiment, the power limiter system 152 includes a power limiter 180, a power regulator 182, and a voltage regulator 184. In one instance, the power limiter 180 receives at least one measured operating condition of the system 150. The measured operating condition(s) may include, but is not limited to, a PLL error signal 190 (e.g. PLLERR) from PLL regulator 80 and terminal grid voltage feedback signal 160 (e.g. VT_FBK) from the sensor 54. The measured operating condition may also utilize a measure of negative-sequence voltage ($V_{NEG}$) from sensor 226.

Figure 7:
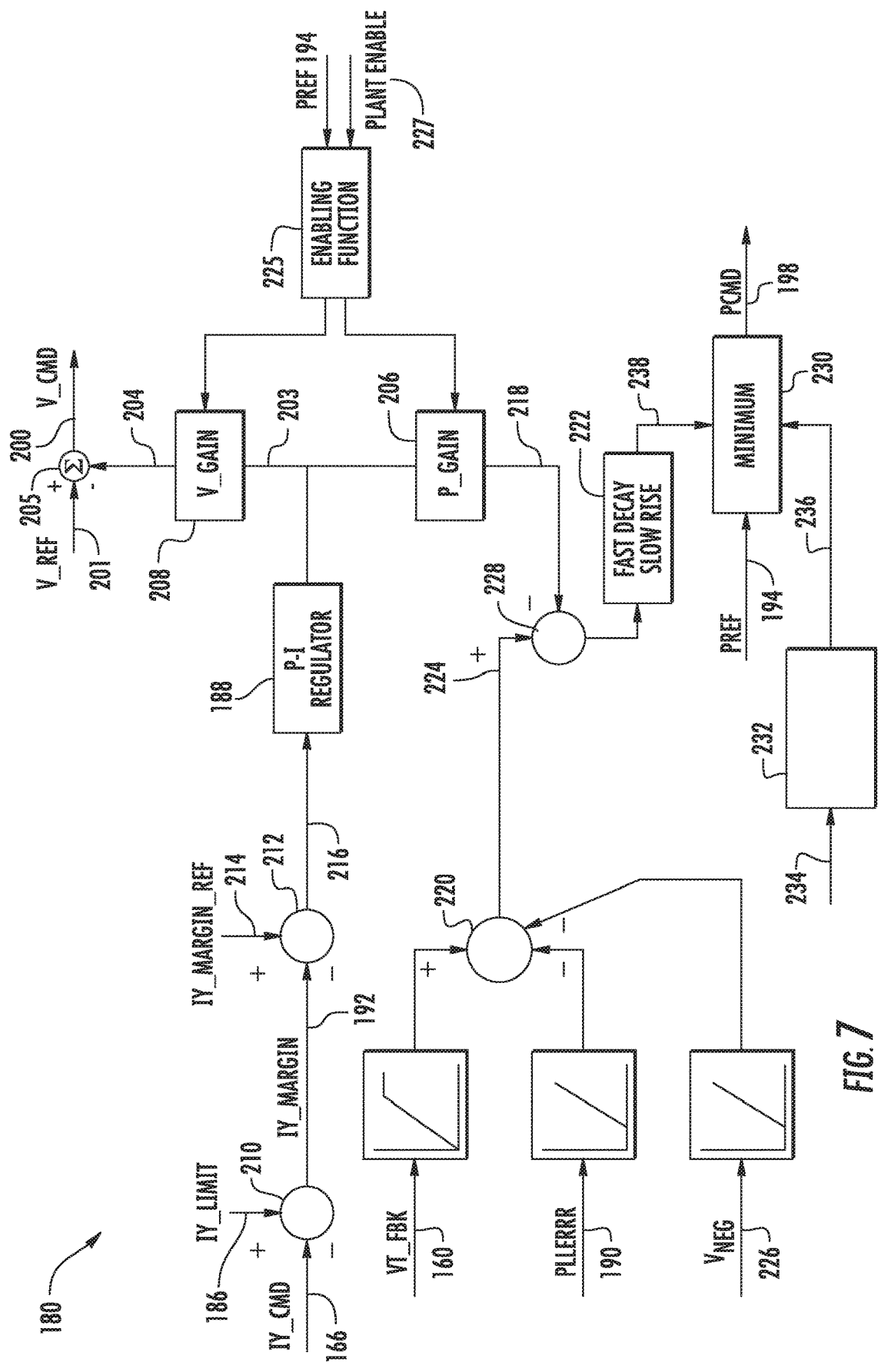
FIG. 7 illustrates a block diagram of one embodiment of a grid-dependent power limiter that may be included within the power limiter system shown in FIG. 5.

The power limiter 180 also receives a stored reference power control signal 194 (e.g. PREF) from, for example, the controller 44 (FIG. 3). In some embodiments, the power limiter 180 receives the terminal grid voltage feedback signal 160, the stored reference power control signal 194, a reactive current margin 192 (e.g. IY_MARGIN), and/or the PLL error signal 190. Thus, as shown, the power limiter 180 generates a power command signal 198 (e.g. PCMD) and transmits the power command signal 198 to the power regulator 182. In addition, as shown, the power limiter 180 may also generate a voltage reduction signal 204 and transmit the voltage reduction signal 204 to the voltage regulator 184. Though reducing power to preserve the reactive power margin is certainly needed when operating near the limits of power transfer capability, in certain instances, this may not be the desired approach. For example, in some scenarios (e.g. lower power or stronger transmission), it would be preferable to reduce the voltage command to the voltage regulator 184 rather than active power. Thus, the voltage reduction signal 204 provides such capabilities. More specifically, as shown in FIG. 7, the power limiter 180 may include a voltage gain 208 or multiplier that is applied to an output 203 of the proportional-integral regulator block 188. The voltage reduction signal 204, which is shown as the output of the voltage gain 208, may then be compared to a voltage reference signal 201 (e.g. V_REF) at function block 205. Thus, as shown, the function block 205 generates a voltage command 200 (e.g. V_CMD) for the voltage regulator 184.

The power regulator 182 generates the real current command signal 166 and transmits the signal 166 to the converter interface controller 156. The real current command signal 166 instructs the converter interface controller 156 to decrease a real component of current that the conversion assembly 34 tries to inject onto the utility grid 136. In one embodiment, the power command signal 198 provides the power regulator 182 with a signal corresponding to an occurrence of a grid contingency event.

To support the terminal voltage, upon a drop in terminal voltage identified by the voltage regulator 184 based on the terminal voltage feedback signal 160, the voltage regulator 184 generates the reactive current command signal 168 (e.g. IY_CMD) and sends the command signal 168 to the converter interface controller 156. The current command signal 168 instructs the converter interface controller 156 to increase a reactive component of current injected onto the utility grid 136 upon occurrence of a grid contingency event. As shown, the converter interface controller 156 may also be referred to herein as a converter firing control. As described above, the PLL regulator 80 may be included within the controller 44, or may be coupled to, but separate from, the controller 44.

Still referring to FIG. 6, the PLL regulator 80 also receives the terminal voltage feedback signal 160. For example, the PLL regulator 80 may receive the terminal voltage feedback signal 160 (shown in FIG. 3 as $V_t$) provided by the sensor 54 (shown in FIG. 3). As described above, the PLL regulator 80 generates the PLL error signal 190 (e.g. PLLERR) and a PLL phase angle signal 202 (e.g. TH_PLL). The PLL phase angle signal 202 is transmitted to the converter interface controller 156 for control of the assembly 34 and for subsequent control of electrical currents injected onto the utility grid 136 (shown in FIG. 5).

Referring now to FIG. 7, a block diagram of one embodiment of a grid-dependent power limiter, for example, the power limiter 180 (shown in FIG. 6) is illustrated. As described above, in weak AC power systems, maximum power transmission requires active voltage regulation for stability and to prevent voltage collapse. Thus, as shown, the power limiter 180 may include a reactive current margin input 192 for maintaining a sufficient reactive current margin. As shown, a function block 220 within the power limiter 180 receives the terminal voltage feedback signal 160 (e.g. VT_FBK) and/or the PLL error signal 190 (e.g. PLLERR). The output 224 of the function block 220 is sent to function block 228.

Upon occurrence of a grid contingency event, the terminal voltage feedback signal 160 indicates a sudden reduction in the terminal voltage. Accordingly, the power limit function block 222 generates a rapidly reducing power limit control signal 224 to facilitate stabilizing the system 150. After the terminal voltage feedback signal 160 indicates that the grid contingency event has ended (e.g., the terminal voltage increases), the power limit function block 222 generates a slowly rising power limit control signal 224. The real current injected onto the utility grid 136 rises according to the power limit control signal 224. Slowly increasing the power injected onto the utility grid 136 facilitates preventing power oscillations. Furthermore, slowly increasing the power injected onto the utility grid 136 provides time for higher level changes in the operation of the system 150 that allow system 150 to adapt to the grid contingency event.

As described above, the PLL error signal 190 and the terminal voltage feedback signal 160 are both indicators of the occurrence of a grid contingency event. For example, a PLL error signal 190 that corresponds to a high PLL error and a terminal voltage feedback signal 160 that corresponds to a reduction in terminal voltage 138 are indications that a grid contingency event has occurred. In response to a high PLL error signal 190 and/or a low terminal voltage feedback signal 160, the power limit function block 222 generates a rapidly reducing power limit control signal 224. After the PLL error signal 190 and/or the terminal voltage feedback signal 160 indicate that the grid contingency event has ended (e.g., the PLL error and/or the terminal voltage returns to a predefined level), the power limit function block 222 generates a slowly rising power limit control signal 224. The power injected onto the utility grid 136 rises according to the power limit control signal 224. As described above, slowly increasing the power injected onto the utility grid 136 facilitates preventing power oscillations.

To prevent voltage collapse in the system 150, another function block 210 of the power limiter 180 generates a reactive current margin signal 192 (e.g. IY_MARGIN) based on a difference between the reactive current command 166 (e.g. IY_CMD) of the wind turbine 10 and an upper reactive current limit 186 (e.g. IY_LIMIT) for the wind turbine 10. In certain embodiments, as shown, the reactive current margin signal 192 may then be compared to a reactive current margin reference 214 (e.g. IY_MARGIN_REF) at function block 212. The output 216 of function block 212 may then be further processed via the proportional-integral regulator block 188. A power gain 206 may then be applied to the output 203 of the proportional-integral regulator block 188 to generate a processed reactive current margin signal 218. The processed reactive current margin signal 218 is then compared to the output 224 of the function block 220 via function block 228 and the difference of the two is sent to the fast decay slow rise block 222, which generates output signal 238.

The two gains described herein P_GAIN 206 and V_GAIN 208 provide a means to weight the action of the reactive margin regulator to either voltage reduction or power reduction, or any ratio in between. As such, the gains 206, 208 can be selected based upon knowledge of the strength of the power system and the active power being generated at a certain moment in time. In certain embodiments, there may also be a time-dependency characteristic of the gains 206, 208, such that the action may be weighted more toward power during a grid transient condition, while being weighted more towards voltage during steady operation.

In certain embodiments, as shown, the gains 206 and 208 can be estimated from an enabling function 225, which enables voltage reduction or power reduction based, at least partially, on the reference power from the turbine control (e.g. $P_{REF}$ 194) and a plant enable signal 227. For example, in one embodiment, the plant enable signal 227 can be generated from a plant level controller using Point-Of-Interconnection information and information from the transmission system topology.

In another embodiment, the voltage reduction signal 204 may be used to create a limit on V_REF 201 rather than as a signal that is subtracted from V_REF 201 to create the voltage command V_CMD 200. In addition, the system may use a measure of negative-sequence voltage $V_{NEG}$ 226 to modify the power reference. More specifically, as shown in FIG. 7, this may be introduced as a summation with the other signals. In another embodiment, the $V_{NEG}$ 226 signal may be utilized to create a separate limit on the power reference, whereby the final power command 198 would be the lower of the limit created by $V_{NEG}$ 226 or the signal 238 created by the other feedback signals.

Still referring to FIG. 7, the power limiter 180 may also include a higher-level control 232, e.g. the farm-level controller 94, in embodiments where the wind turbine power system 10 is part of the wind farm 90. Although described as included within the power limiter 180, the higher-level control 232 may also be positioned remotely from the power limiter 180. As described above, slowly increasing the power injected onto utility the grid 136 facilitates preventing power oscillations. Slowly increasing the power injected onto the utility grid 136 also provides time for higher level changes in the operation of the system 150 that allow the system 150 to adapt to the grid contingency event. The higher-level control 232 receives at least one wind farm input signal, for example, the input signal 234 from the wind farm 90. The wind farm input signal 234 may correspond to changes in the utility grid 136, for example, but not limited to, breaker contact signals or communication signals from remote substations. The input signal 234 may also correspond to a voltage measurement at a point of common coupling for a plurality of wind turbines 92 within the wind farm 90. Thus, in one embodiment, the converter controller 156 may send a signal to the higher-level control 232 indicating a power command limit value for at least one of the wind turbines 92 in the wind farm 90. In additional embodiments, the higher-level control 232 may also receive signals from all of the wind turbines 92 in the wind farm 90. As such, the higher-level control 232 generates or determines a power curtailment signal 236 based at least partially on the input signal(s) 234, and provides the curtailment signal 236 to select wind turbines 92 in the wind farm 90.

More specifically, as shown, the curtailment signal 236 is provided to the comparator function block 230, where the power command signal 198 is generated. For example, if the input signal 234 received by the higher-level control 232 corresponds to more than a predefined number of remote substations unable to carry the level of power currently being received, the higher-level control 232 will generate curtailment signal 236, which upon receipt, instructs the comparator function block 230 to generate a power command signal 198 that curtails a wind turbine's output below that which would otherwise be available from the prevailing wind conditions. In another example, if the higher-level control 232 determines that the voltage at the point of common coupling for a plurality of wind turbines has remained below a predefined level for more than a predefined period of time, the higher-level control 232 will generate the curtailment signal 236, which upon receipt, instructs the comparator function block 230 to generate a power command signal 198 that curtails a wind turbine's output below that which would otherwise be available from the prevailing wind conditions. Thus, as shown, the comparator block 230 selects the lesser of signal 238, a reference power control signal 194, and curtailment signal 236 and generates the power command signal 198 (e.g. PCMD) based on same.

The power limiter system 152 also includes a memory, for example, memory 66 (shown in FIG. 3). The memory 66 is configured to store data related to operation of the wind turbine 10. For example, the memory 66 may store at least one variable that correspond to, for example but not limited to, the PLL error 190 and the voltage feedback 160. More specifically, the controller 44 is configured to sample the current value of predefined variables and store the current value in the memory 66 upon occurrence of an event. For example, upon occurrence of a grid contingency event, current values for the PLL error 190 and the voltage feedback 160 are stored in the memory 66. The memory 66 may be accessed by a user to, for example, monitor operation of the wind turbine 10.

Figure 8:
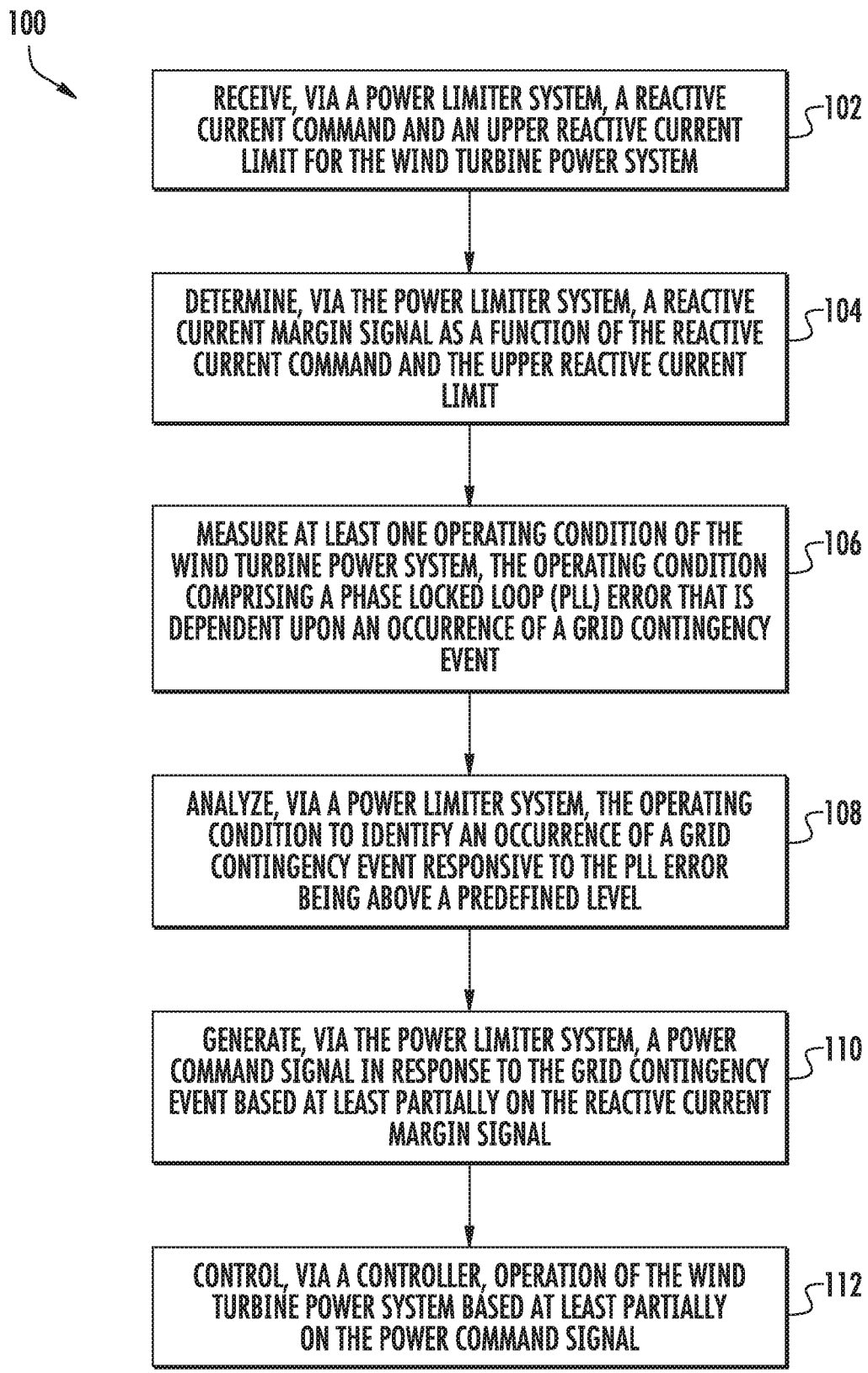
FIG. 8 illustrates a flow diagram of one embodiment of a method for controlling operation of a power system connected to a power grid according to the present disclosure.

Referring now to FIG. 8, a flow diagram of one embodiment of a method for controlling operation of the wind turbine 10 is illustrated. As shown at 102, the method 100 includes receiving, via the power limiter system 152, the reactive current command IY_CMD and the upper reactive current limit IY_LIMIT for the wind turbine 10. As shown at 104, the method 100 includes determining, via the power limiter system 152, the reactive current margin signal IY_MARGIN 192 as a function of the reactive current command IY_CMD and the upper reactive current limit IY_LIMIT. As shown at 106, the method 100 includes measuring at least one operating condition of the wind turbine 10. For example, as shown in FIG. 6, the operating condition may include a phase locked loop (PLL) error 190 that is dependent upon an occurrence of a grid contingency event. Thus, as shown at 108, the method 100 includes analyzing, via the power limiter system 152, the operating condition to identify an occurrence of a grid contingency event responsive to the PLL error 190 being above a predefined level. As shown at 110, the method 100 includes generating, via the power limiter system 152, the power command signal 198 PCMD in response to the grid contingency event based at least partially on the reactive current margin signal 192. As shown at 112, the method 100 further includes controlling, via the controller 44, operation of the power system based at least partially on the power command signal 198. More specifically, in one embodiment, the controller 44 may control operation of the power system by limiting operation thereof based at least partially on the power command signal 198. More specifically, in certain embodiments, the method 100 may include sending, via the converter controller 156, a signal to the controller 44 indicating a power command limit value. The system controller 44 receives the signal from the converter controller 156 and then modifies torque and/or speed command for a predetermined duration based on the power command limit value. Alternatively, the controller 44 may receive the signal from the converter controller 156 and implement a power system shut down.

Figure 9:
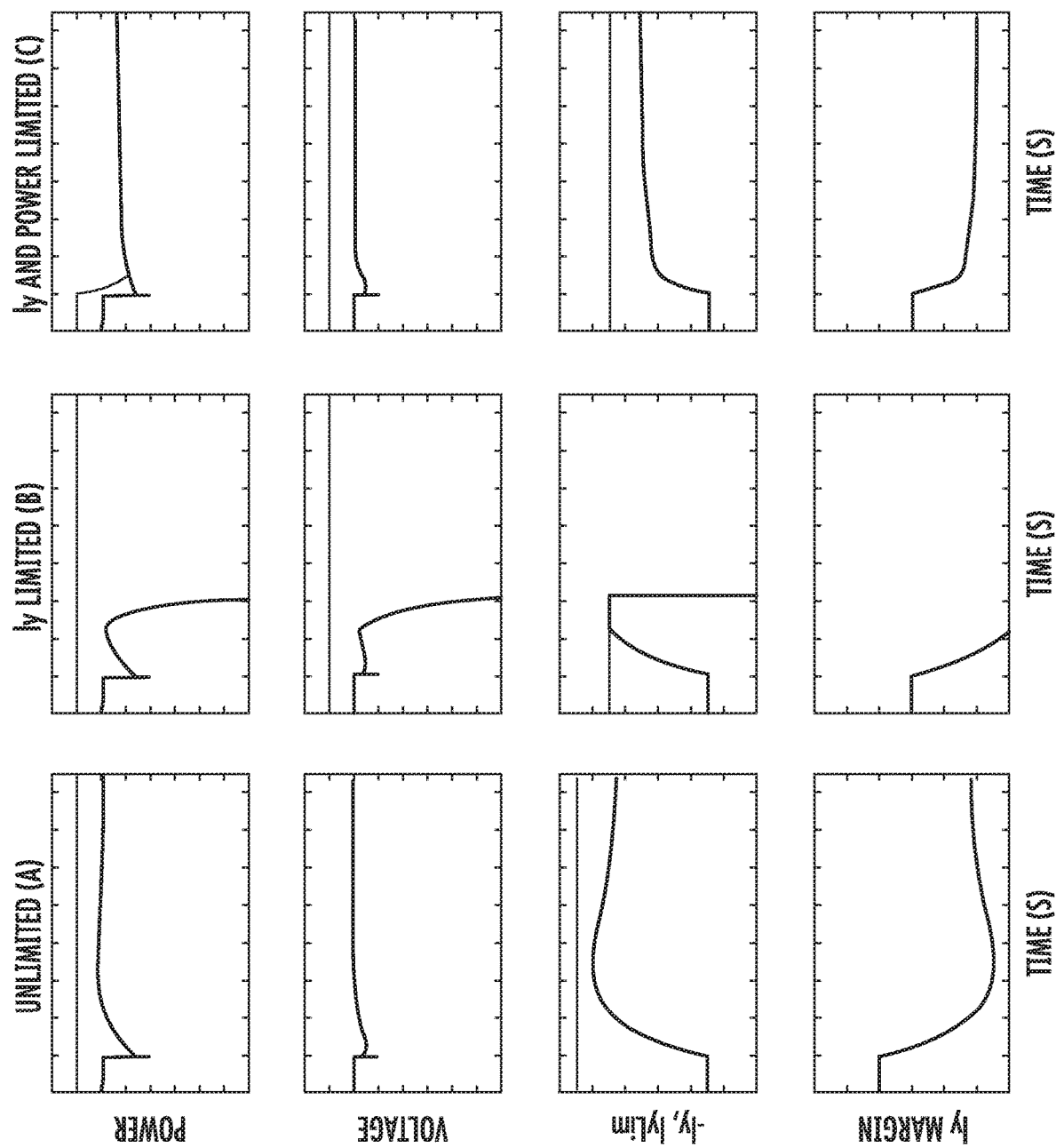
FIG. 9 illustrates simulation results of operating the wind turbine power system according to the present disclosure.

Referring now to FIG. 9, simulation results of the present disclosure are illustrated. As shown, the illustrated graphs are representative of a wind farm operating into a transmission grid of very high impedance (e.g. a long distance). A disturbance in the grid results in the need for more reactive current from the wind turbine generators to support the desired power transfer. For purposes of illustrating the present disclosure, the influence of voltage and phase error are removed from the structure, leaving only the reactive current margin feature. Thus, as shown, column (a) illustrates the stable response of power, voltage, $-I_Y$, $I_{YLIM}$, and $I_{YMARGIN}$ when the reactive current $I_Y$ is unconstrained or unlimited, where there is positive margin throughout the transient. Column (b) illustrates an unstable collapse if the reactive current $I_Y$ is constrained by the power limiter 180 to less than needed to support the power transfer. In contrast, column (c) illustrates the stable response achieved with the present disclosure. More specifically, as shown, power is constrained in steady-state while reactive margin is retained for stabilizing the system.

Figure 10:
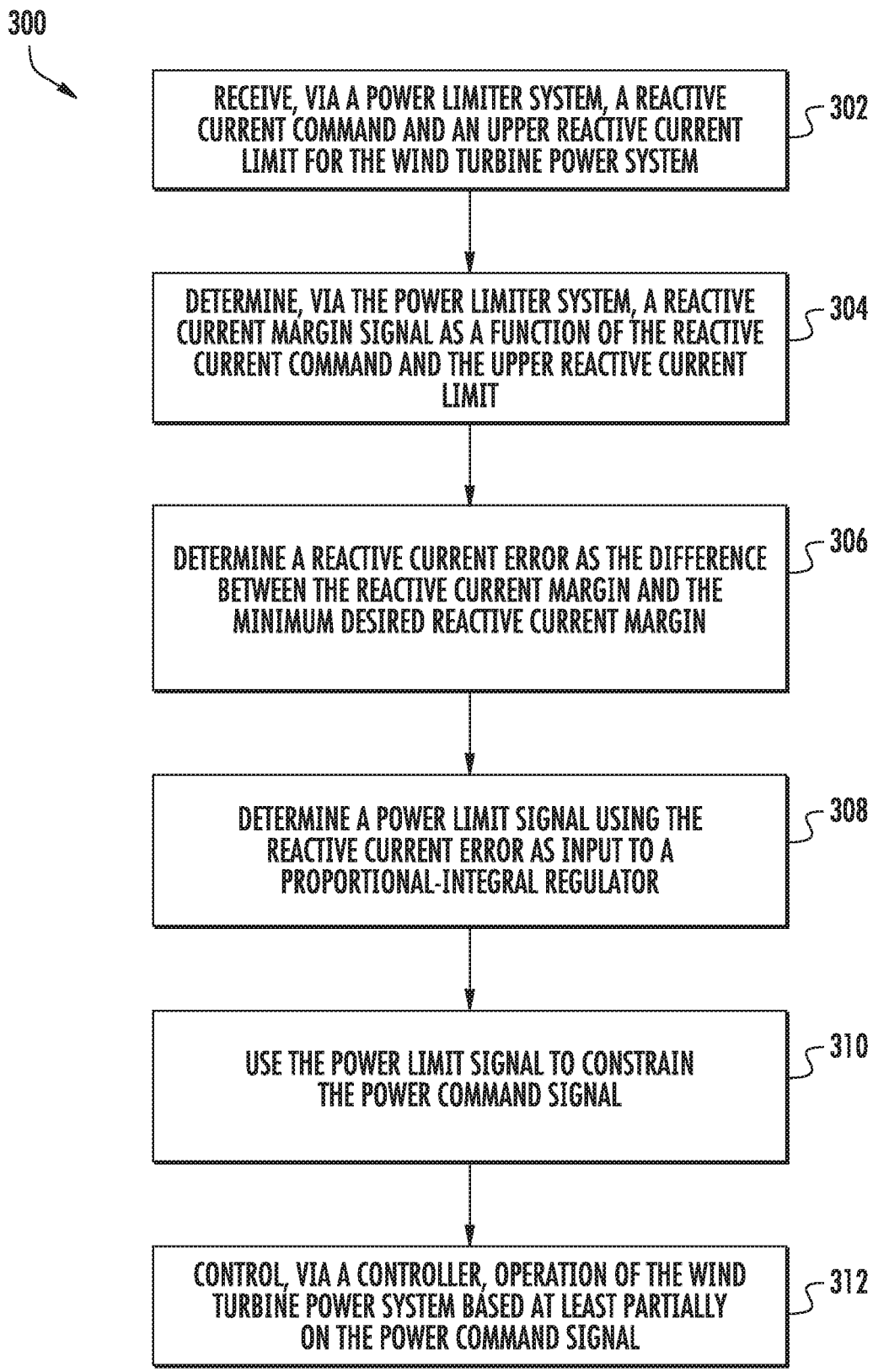
FIG. 10 illustrates a flow diagram of one embodiment of a method for controlling operation of a power system connected to a power grid according to the present disclosure.

Referring now to FIG. 10, a flow diagram of another embodiment of a method 300 for controlling operation of the wind turbine 10 is illustrated. As shown at 302, the method 300 includes receiving, via the power limiter system 152, the reactive current command IY_CMD and the upper reactive current limit IY_LIMIT for the wind turbine 10. As shown at 304, the method 300 includes determining, via the power limiter system 152, the reactive current margin signal IY_MARGIN 192 as a function of the reactive current command IY_CMD and the upper reactive current limit IY_LIMIT. As shown at 306, the method 300 includes determining a reactive current error as the difference between the reactive current margin and the minimum desired reactive current margin. As shown at 308, the method 300 includes determining a power limit signal using the reactive current error as input to a proportional-integral regulator. As shown at 310, the method 300 includes using the power limit signal to constrain the power command signal. As shown at 312, the method 300 further includes controlling operation of the wind turbine power system based at least partially on the power command signal.

Exemplary embodiments of a wind turbine, power limiter system, and methods for operating a wind turbine in response to an occurrence of a grid contingency event are described above in detail. The methods, wind turbine, and power limiter system are not limited to the specific embodiments described herein, but rather, components of the wind turbine, components of the power limiter system, and/or steps of the methods may be utilized independently and separately from other components and/or steps described herein. For example, the power limiter system and methods may also be used in combination with other wind turbine power systems and methods, and are not limited to practice with only the power system as described herein. Rather, one embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for maintaining sufficient reactive current margin in a power system connected to a power grid after a disturbance in the power system, the power system having a power converter, the method comprising:
   receiving, via a power limiter system of a converter controller of the power converter, a reactive current command and an upper reactive current limit for the power system;
   determining, via the power limiter system, a reactive current margin signal as a function of the reactive current command and the upper reactive current limit;
   receiving a reference power control signal from a system controller, wherein the reference power control signal is a measured power output of the power system;
   generating, via the power limiter system, a power command signal for the power converter based on the reactive current margin signal and the reference power control signal; and,
   controlling, via the converter controller, operation of the power converter of the power system based at least partially on the power command signal.

2. The method of claim 1, wherein determining the reactive current margin signal as a function of the reactive current command and the upper reactive current limit further comprises calculating a difference between the reactive current command and the upper reactive current limit.

3. The method of claim 1, further comprising processing the reactive current margin signal via a proportional-integral regulator.

4. The method of claim 1, wherein controlling operation of the power converter of the power system further comprises limiting operation of the power converter of the power system based at least partially on the power command.

5. The method of claim 4, further comprising sending, via the converter controller, a signal to the system controller indicating a power command limit value.

6. The method of claim 5, further comprising receiving, via the system controller, the signal from the converter controller and modifying at least one of torque and/or speed commands for a predetermined duration based on the power command limit value.

7. The method of claim 5, further comprising receiving, via the system controller, the signal from the converter controller and implementing a power system shut down.

8. The method of claim 1 further comprising sending, via the converter controller, a signal to a plant-level controller indicating a power command limit value for at least one power system in a collection of power systems.

9. The method of claim 8, further comprising:
   receiving, via the plant-level controller, signals from all power systems in the collection of power systems;
   determining, via the plant-level controller, a power curtailment command required for stable operation of the collection of power systems; and,
   sending, via the plant-level controller, the power curtailment command to each of the power systems.

10. The method of claim 1, wherein the power system comprises at least one of a wind turbine power system, a solar power system, or an energy storage system.

11. An electrical power system connected to a power grid, comprising:
    an electric generator;
    a power conversion assembly coupled to the electric generator, the power conversion assembly configured to receive power generated by the electric generator and convert the power received to a power suitable for transmission to the power grid;
    a power limiter system communicatively coupled to the power conversion assembly, the power limiter system configured to:
       receive a reactive current command and an upper reactive current limit for the electrical power system;
       determine a reactive current margin signal as a function of the reactive current command and the upper reactive current limit;

receive a reference power control signal from a controller of the electrical power system, wherein the reference power control signal is a measured power output of the power system; and, generate a power command signal based on the reactive current margin signal and the reference power control signal; and, a converter controller coupled to the power limiter system, the converter controller configured to control operation of the power conversion assembly of the electrical power system based at least partially on the power command signal.

12. The electrical power system of claim 11, wherein the power limiter system is further configured to process the reactive current margin signal via a proportional-integral regulator.

13. The electrical power system of claim 11, wherein the electrical power system comprises at least one of a wind turbine power system, a solar power system, or an energy storage system.

14. A method for controlling operation of a wind turbine power system connected to a power grid, the wind turbine power system having a power conversion assembly, the method comprising:

receiving, via a power limiter system of the wind turbine power system, a reactive current command and an upper reactive current limit for the wind turbine power system;

determining, via the power limiter system, a reactive current margin signal as a function of the reactive current command and the upper reactive current limit;

measuring at least one operating condition of the wind turbine power system, the operating condition comprising a phase locked loop (PLL) error that is dependent upon an occurrence of a grid contingency event;

analyzing, via the power limiter system, the operating condition to identify an occurrence of a grid contingency event responsive to the PLL error being above a predefined level;

receiving a reference power control signal from a turbine controller of the wind turbine power system, wherein the reference power control signal is a measured power output of the power system;

generating, via the power limiter system, a power command signal in response to the grid contingency event based at least partially on the reactive current margin signal and the reference power control signal; and, controlling, via a converter controller, operation of the power conversion assembly of the wind turbine power system based at least partially on the power command signal.

15. The method of claim 14, wherein determining the reactive current margin signal as a function of the reactive current command and the upper reactive current limit further comprises calculating a difference between the reactive current command and the upper reactive current limit.

16. The method of claim 14, further comprising processing the reactive current margin signal via a proportional-integral regulator.

17. The method of claim 14, wherein measuring the at least one operating condition further comprises measuring a terminal grid voltage.

18. The method of claim 14, wherein controlling operation of the power conversion assembly of the wind turbine power system further comprises limiting operation of the wind turbine power system based at least partially on the power command.

19. The method of claim 18, wherein limiting operation of the wind turbine power system based at least partially on the power command further comprises:

sending, via the converter controller, a signal to the turbine controller indicating a power command limit value;

receiving, via the turbine controller, the signal from the converter controller; and, modifying at least one of torque and/or speed commands for a predetermined duration based on the power command limit value.

20. The method of claim 18, wherein limiting operation of the wind turbine power system based at least partially on the power command further comprises:

sending, via the converter controller, a signal to the turbine controller indicating a power command limit value;

receiving, via the turbine controller, the signal from the converter controller; and, implementing a power system shut down in response to the signal.

* * * * *